(12) United States Patent
Lee

(10) Patent No.: US 11,169,739 B2
(45) Date of Patent: Nov. 9, 2021

(54) APPARATUS AND METHOD FOR TRANSFERRING INTERNAL DATA OF MEMORY SYSTEM IN SLEEP MODE

(71) Applicant: SK hynix Inc., Icheon (KR)

(72) Inventor: Jong-Hwan Lee, Icheon (KR)

(73) Assignee: SK hynix, Icheon (KR)

( * ) Notice: Subject to any disclaimer, the term of this patent is extended or adjusted under 35 U.S.C. 154(b) by 0 days.

(21) Appl. No.: 16/734,075

(22) Filed: Jan. 3, 2020

(65) Prior Publication Data

US 2020/0409602 A1    Dec. 31, 2020

(30) Foreign Application Priority Data

Jun. 28, 2019 (KR) .................. 10-2019-0077806

(51) Int. Cl.
*G06F 3/06* (2006.01)

(52) U.S. Cl.
CPC .......... *G06F 3/0659* (2013.01); *G06F 3/0625* (2013.01); *G06F 3/0647* (2013.01); *G06F 3/0658* (2013.01); *G06F 3/0683* (2013.01)

(58) Field of Classification Search
CPC .... G06F 3/0625; G06F 3/0638; G06F 3/0619; G06F 3/0629; G06F 3/0685; G06F 3/0647; G06F 3/0604; G06F 3/0659; G06F 3/0658; G06F 3/0683; G06F 1/266; G06F 1/26; G06F 1/3275; G06F 1/3287; G06F 1/30; G11C 5/148
See application file for complete search history.

(56) References Cited

U.S. PATENT DOCUMENTS

| | | | |
|---|---|---|---|
| 9,128,715 B2 | 9/2015 | Stenfort | |
| 9,229,854 B1 | 1/2016 | Kuzmin et al. | |
| 9,378,135 B2 | 6/2016 | Bennett | |
| 9,400,749 B1 | 7/2016 | Kuzmin et al. | |
| 9,547,360 B2 | 1/2017 | Park et al. | |
| 9,927,994 B2 | 3/2018 | Byun | |
| 10,157,004 B2 | 12/2018 | Michaeli | |
| 10,198,198 B2 * | 2/2019 | Machida | G06F 1/266 |
| 10,229,051 B2 | 3/2019 | Hwang et al. | |
| 10,860,228 B1 | 12/2020 | Mulani et al. | |

(Continued)

FOREIGN PATENT DOCUMENTS

| | | |
|---|---|---|
| KR | 1020140065856 A | 5/2014 |
| KR | 1020180123192 A | 11/2018 |

OTHER PUBLICATIONS

Non-Final Office Action dated Mar. 26, 2021 for U.S. Appl. No. 16/673,730.

(Continued)

*Primary Examiner* — Ernest Unelus

(57) ABSTRACT

A memory system may include: a nonvolatile memory device; a volatile memory device to which power is suspended in the sleep mode; and a controller configured to temporarily store internal data in the volatile memory device, the internal data being generated during processing of an operation of the nonvolatile memory device. When a sleep command is received by the memory system from a host, the controller may output the internal data stored in the volatile memory device to the host in response to the sleep command, and then may transfer an acknowledgement for an entry into the sleep mode to the host and enter the sleep mode.

20 Claims, 9 Drawing Sheets

(56) References Cited

U.S. PATENT DOCUMENTS

| | | |
|---|---|---|
| 2007/0283125 A1 | 12/2007 | Manczak et al. |
| 2008/0189485 A1 | 8/2008 | Jung et al. |
| 2012/0110259 A1 | 5/2012 | Mills et al. |
| 2013/0268741 A1 | 10/2013 | Daly et al. |
| 2013/0290571 A1 | 10/2013 | Rizzo et al. |
| 2015/0331624 A1 | 11/2015 | Law |
| 2016/0070474 A1 | 3/2016 | Yu et al. |
| 2016/0268741 A1 | 9/2016 | Tsai et al. |
| 2017/0038973 A1* | 2/2017 | Takano ............... G06F 3/0655 |
| 2017/0109089 A1 | 4/2017 | Huang |
| 2017/0357572 A1 | 12/2017 | Okubo et al. |
| 2018/0039578 A1 | 2/2018 | Yun et al. |
| 2018/0081569 A1 | 3/2018 | Kan et al. |
| 2018/0121109 A1 | 5/2018 | Li |
| 2018/0121121 A1 | 5/2018 | Mehra et al. |
| 2018/0239726 A1 | 8/2018 | Wang et al. |
| 2019/0004944 A1 | 1/2019 | Widder et al. |
| 2019/0079859 A1 | 3/2019 | Li et al. |
| 2019/0087125 A1 | 3/2019 | Matsumoto et al. |
| 2019/0108131 A1 | 4/2019 | Lee et al. |
| 2019/0129838 A1 | 5/2019 | Yoshida et al. |
| 2019/0266079 A1 | 8/2019 | R et al. |
| 2019/0384506 A1 | 12/2019 | Shivanand et al. |
| 2020/0225875 A1 | 7/2020 | Oh |
| 2021/0056021 A1 | 2/2021 | Parry et al. |

OTHER PUBLICATIONS

Office Action dated Jun. 28, 2021 for U.S. Appl. No. 16/673,730.
Office Action dated Apr. 14, 2021 for related U.S. Appl. No. 16/681,076.
Office Action dated Jul. 28, 2021 for related U.S. Appl. No. 16/841,431.
Office Action dated Aug. 25, 2021 for related U.S. Appl. No. 16/850,929.

\* cited by examiner

APPARATUS AND METHOD FOR TRANSFERRING INTERNAL DATA OF MEMORY SYSTEM IN SLEEP MODE

CROSS-REFERENCE TO RELATED APPLICATION

This application claims priority under 35 U.S.C. § 119 to Korean Patent Application No. 10-2019-0077806 filed on Jun. 28, 2019, which is incorporated herein by reference in its entirety.

BACKGROUND

1. Field

Illustrative embodiments relate to a data processing system, and more particularly, to an apparatus and method for transferring and storing internal data of a memory system included in a data processing system into a host or computing device

2. Discussion of the Related Art

Recently, a paradigm for a computing environment has shifted to ubiquitous computing, which enables computer systems to be accessed virtually anytime and everywhere. As a result, the use of portable electronic devices, such as mobile phones, digital cameras, notebook computers, and the like, is rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving parts (e.g., a mechanical arm), and has high data access speed and low power consumption. In the context of a memory system having such advantages, an illustrative data storage device includes a USB (Universal Serial Bus) memory device, a memory card having various interfaces, a solid state drive (SSD), or the like.

SUMMARY

Various embodiments are directed to a data processing system for transferring data between components in the data processing system including components or resources such as a memory system and a host.

Also, various embodiments are directed to an apparatus which transfers, to a host, internal data stored in a volatile memory of a memory system to which power is suspended when the memory system included in the data processing system is controlled to enter a sleep mode, and then receives internal data from the host and stores the internal data in the volatile memory of the memory system when exiting from the sleep mode, thereby improving the operational performance of the memory system.

Technical objects of the present disclosure are not limited to the above-described technical objects, and other technical objects which are not described herein will be clearly understood by those skilled in the art to which the present disclosure pertains, based on the following descriptions.

In an embodiment, a memory system may include a nonvolatile memory device; a volatile memory device to which power is suspended in the sleep mode; and a controller configured to temporarily store internal data in the volatile memory device, the internal data being generated during processing of an operation of the nonvolatile memory device, when a sleep command is received from a host, the controller may output the internal data stored in the volatile memory device to the host in response to the sleep command, and then may transfer an acknowledgement for an entry into the sleep mode to the host and enters the sleep mode.

When the sleep command is received from the host, the controller may perform a comparison of the size of the internal data stored in the volatile memory device with the size of data which can be transferred at one time in response to the sleep command, and may determine whether to divide the internal data based on a result of the comparison.

When the result of the comparison indicates that the size of the internal data stored in the volatile memory device exceeds the size of data which can be transferred at one time in response to the sleep command, the controller may divide the internal data stored in the volatile memory device into N portions of data, and may sequentially output the divided internal data from a first portion to an $N^{th}$ portion to the host as the response to the sleep command, and then may transfer the acknowledge for the entry into the sleep mode to the host and enters the sleep mode, where N may be a natural number equal to or more than 2.

When the result of the comparison indicates that the size of the internal data stored in the volatile memory device exceeds the size of data which can be transferred at one time in response to the sleep command: the controller may divide the internal data stored in the volatile memory device into N portions of data, where N may be a natural number equal to or more than 2, and when N exceeds a reference value, the controller may program the internal data stored in the volatile memory device into the nonvolatile memory device, and may transfer the acknowledgement for the entry into the sleep mode to the host and enters the sleep mode.

The controller may send a confirmation request to the host to confirm whether a transfer of the internal data stored in the volatile memory device to the host in response to the sleep command is allowed.

When the host, in response to the confirmation request, confirms that the controller is allowed to transfer the internal data to the host, the controller may output the internal data stored in the volatile memory device to the host as a response to the sleep command, and then may transfer an acknowledgement for an entry into the sleep mode to the host and may enter the sleep mode.

When the host does not indicate in response to the confirmation request that the controller is allowed to transfer the internal data to the host, the controller may program the internal data stored in the volatile memory device to the nonvolatile memory device, and then may transfer the acknowledgement for the entry into the sleep mode to the host and may enter the sleep mode.

When a wakeup command including the internal data is received from the host, the controller may exit from the sleep mode, may supply power to the volatile memory device, may store the internal data included in the wakeup command into the volatile memory device, and may transfer an acknowledgement for the exit from the sleep mode to the host.

In an embodiment, a data processing system may include: a host configured to generate a sleep command and a wakeup command and to output the generated commands; and a memory system comprising a nonvolatile memory device and a volatile memory device, the memory system configured to suspend power to the volatile memory device in a sleep mode and to temporarily store internal data in the volatile memory device, the internal data being generated during processing of an operation of the nonvolatile memory device, when the sleep command is received from the host, the memory system may output the internal data stored in the volatile memory device to the host in response to the sleep command, and then may transfer an acknowledgment for an entry into the sleep mode to the host and enters the sleep mode, and the host may store the internal data received from the memory system in an internal memory between a first time point at which the sleep command is outputted to the memory system and a second time point at which a wakeup command is sent to the memory system.

When the sleep command is received from the host, the memory system may determine whether to divide the internal data by comparing the size of the internal data stored in the volatile memory device with the size of data which can be transferred at one time in response to the sleep command.

When the size of the internal data stored in the volatile memory device exceeds the size of data which can be transferred at one time in response to the sleep command, the memory system may divide the internal data stored in the volatile memory device into N portions of data, may sequentially output the divided internal data from a first portion to an $N^{th}$ portion to the host in response to the sleep command, and then may transfer the acknowledgement for the entry into the sleep mode to the host and enters the sleep mode, where N may be a natural number equal to or more than 2.

When the size of the internal data stored in the volatile memory device exceeds the size of data which can be transferred at one time in response to the sleep command: the memory system may divide the internal data stored in the volatile memory device into N portions of data, and when N exceeds a reference value, the memory system may program the internal data stored in the volatile memory device to the nonvolatile memory device, and then may transfer the acknowledgement for the entry into the sleep mode to the host and enters the sleep mode.

The memory system, in response to receiving the sleep command, may send a confirmation request to the host to confirm whether a transfer of the internal data stored in the volatile memory device to the host is allowed, and when the confirmation request is received by the host from the memory system between the first time point and reception of the acknowledgement for the entry into the sleep mode, the host: may check the state of the internal memory, may determine, according to the check result, whether the memory system is allowed to transfer the internal data to the host, and may transfer to the memory system an acknowledgement indicating whether the memory system is allowed to transfer the internal data to the host.

The memory system, in response to the acknowledgment indicating that the memory system is allowed to transfer the internal data to the host, may output the internal data stored in the volatile memory device to the host as a response to the sleep command, and then may transfer the acknowledgment for the entry into the sleep mode to the host and may enter the sleep mode.

The memory system, in response to the acknowledgment indicating that the memory system is not allowed to transfer the internal data to the host, may program the internal data stored in the volatile memory device to the nonvolatile memory device, and then may transfer the acknowledgement for the entry into the sleep mode to the host and may enter the sleep mode.

The host may include second data stored in the internal memory in the wakeup command and may output the wakeup command with the second data to the memory system, when the wakeup command is received by the memory system from the host, the memory system may exit from the sleep mode, may supply power to the volatile memory device, may store the second data included in the wakeup command into the volatile memory device, and may transfer an acknowledgment for an exit from the sleep mode to the host.

In an embodiment, an operating method of a memory system which includes a nonvolatile memory device and a volatile memory device, the operating method may include: receiving a sleep command from a host; outputting internal data stored in the volatile memory device to the host in response to the sleep command after the receiving of the sleep command, the internal data being data generated during processing of an operation of the nonvolatile memory device; transferring an acknowledgment for an entry into the sleep mode to the host; and entering the sleep mode after the outputting of the internal data, entering the sleep mode may include suspending power to the volatile memory device.

The outputting of the internal data may include: determining whether to divide the internal data by comparing the size of the internal data stored in the second volatile memory device with the size of data which can be transferred at one time in response to the sleep command; in response to determining to divide the internal data: dividing the internal data stored in the second volatile memory device into N portions of data; outputting the divided internal data from a first portion to an $N^{th}$ portion to the host as a response to the sleep command when N is less than a reference value; and programming the internal data stored in the volatile memory device to the nonvolatile memory device when N exceeds the reference value.

The operating method may further include: in response to the receiving of the sleep command, confirming whether a transfer of the internal data stored in the volatile memory device to the host is allowed; performing the outputting of the internal data in response to the host indicating that the memory system is allowed to transfer the internal data to the host; and programming the internal data to the nonvolatile memory device, when the host indicates that the memory system is not allowed to transfer the internal data to the host.

The operating method may further include: in response to receiving a wakeup command from the host: exiting from the sleep mode, supplying power to the volatile memory device, storing the internal data included in the wakeup command into the volatile memory device, and transferring an acknowledgement for an exit from the sleep mode to the host.

DETAILED DESCRIPTION

Figure 1:
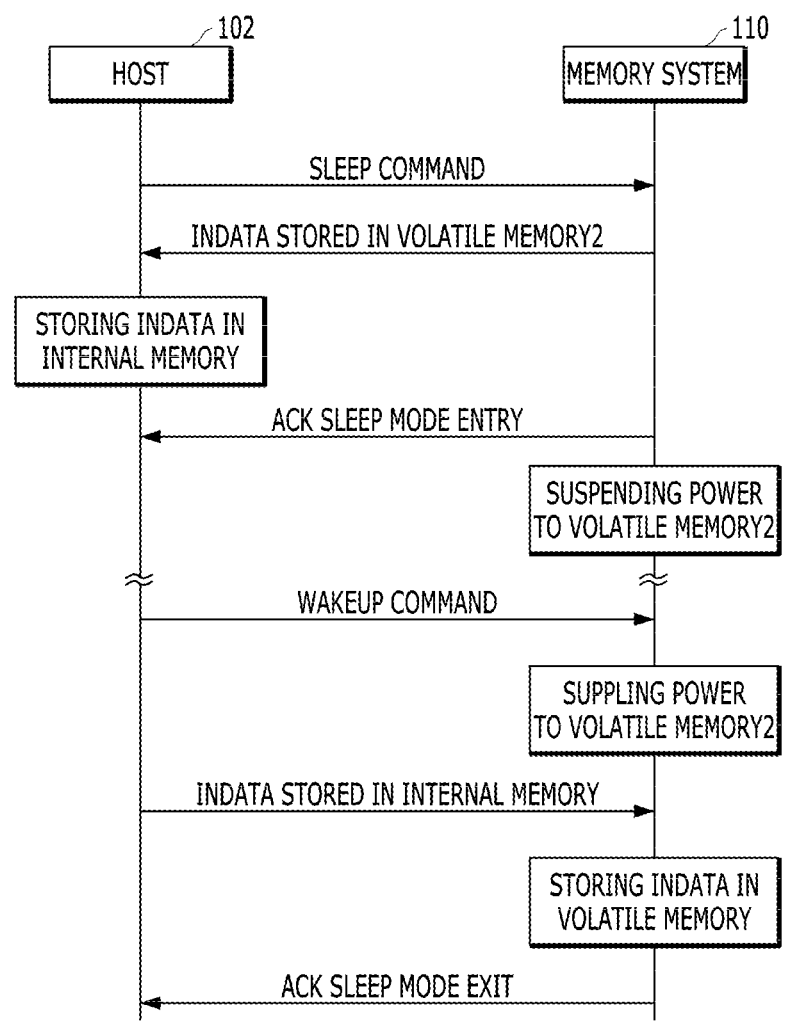
FIG. 1 illustrates sleep mode entry and exit operations in a data processing system in accordance with an embodiment.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates sleep mode entry and exit operations in a data processing system in accordance with an embodiment.

Referring to FIG. 1, a host 102 and a memory system 110 may be interconnected with each other. The host 102 may be understood as a computing device, and implemented in the form of a mobile device, a computer, a server or the like. The memory system 110 interconnected with the host 102 may receive a command from the host 102 and store or output data in response to the received command.

The memory system 110 may include a nonvolatile memory device including nonvolatile memory cells. For example, the memory system 110 may be implemented in the form of a flash memory, a solid state drive (SSD), or the like.

The memory system 110 may include a volatile memory device for temporarily storing internal data INDATA generated during processing of an operation on the nonvolatile memory device. For example, the memory system 110 may generate mapping data as the internal data INDATA, the mapping data being used to perform mapping (such as logical address to physical address mapping) to connect a file system used by the host 102 to a storage space of the nonvolatile memory device. Furthermore, the memory system 110 may generate read/write/erase count data as the internal data INDATA in order to manage the reliability and lifetime of the nonvolatile memory device.

When no write or read operation is scheduled to be performed on the memory system 110 for a predetermined time or more, the host 102 may request the memory system 110 to enter a sleep mode in order to reduce power consumption of the memory system 110.

In an embodiment, the host 102 may generate a sleep command SLEEP COMMAND and transfer the sleep command SLEEP COMMAND to the memory system 110 in order to request the memory system 110 to enter the sleep mode.

In an embodiment, when the sleep command SLEEP COMMAND is received from the host 102, the memory system 110 may output internal data INDATA stored in a volatile memory VOLATILE MEMORY2 of the memory system 110 to the host 102 in response to the sleep command SLEEP COMMAND. At this time, although not illustrated in detail in FIG. 1, the memory system 110 may include a first volatile memory to which power is supplied in the sleep mode and a second volatile memory to which power is suspended in the sleep mode. Therefore, the memory system 110 may output a first portion of the internal data INDATA stored in the second volatile memory VOLATILE MEMORY2 to the host 102 in response to the sleep command SLEEP COMMAND, and not output a second portion of the internal data INDATA stored in the first volatile memory device to the host 102.

In an embodiment, after outputting the internal data INDATA stored in the volatile memory VOLATILE MEMORY2 to the host 102, the memory system 110 may acknowledge entry into the sleep mode by sending an ACK SLEEP MODE ENTRY message to the host 102 and then enter the sleep mode. While in the sleep mode, the memory system 110 may supply power to the first volatile memory device therein and suspend power to the second volatile memory VOLATILE MEMORY2. At this time, the second volatile memory VOLATILE MEMORY2 to which power is suspended in response to the entry into the sleep mode may lose all of the first portion of the internal data INDATA stored therein, and the first volatile memory device to which power is supplied may retain the second portion of the internal data INDATA stored therein.

In an embodiment, the host 102 may store the internal data INDATA received from the memory system 110 in an internal memory INTERNAL MEMORY of the host 102 while the memory system 110 is in the sleep mode.

In an embodiment, when the host 102 intends to request the memory system 110 which has entered the sleep mode to exit from the sleep mode, the host 102 may generate a wakeup command WAKEUP COMMAND and transfer the wakeup command WAKEUP COMMAND to the memory system 110. The host 102 may include the internal data INDATA stored in the internal memory INTERNAL MEMORY in the wakeup command WAKEUP COMMAND, and communicate the wakeup command WAKEUP COMMAND with the internal data INDATA to the memory system 110.

In an embodiment, when the memory system 110 receives the wakeup command WAKEUP COMMAND from the host 102, the memory system 110 may exit from the sleep mode, and supply power to the second volatile memory VOLATILE MEMORY2 to which power has been suspended during the sleep mode interval. Then, the memory system 110 may store the internal data INDATA which has been received with the wakeup command WAKEUP COMMAND from the host 102 in the second volatile memory VOLATILE MEMORY2, and transfer an acknowledgment for the exit from the sleep mode ACK SLEEP MODE EXIT to the host 102.

Figure 2:
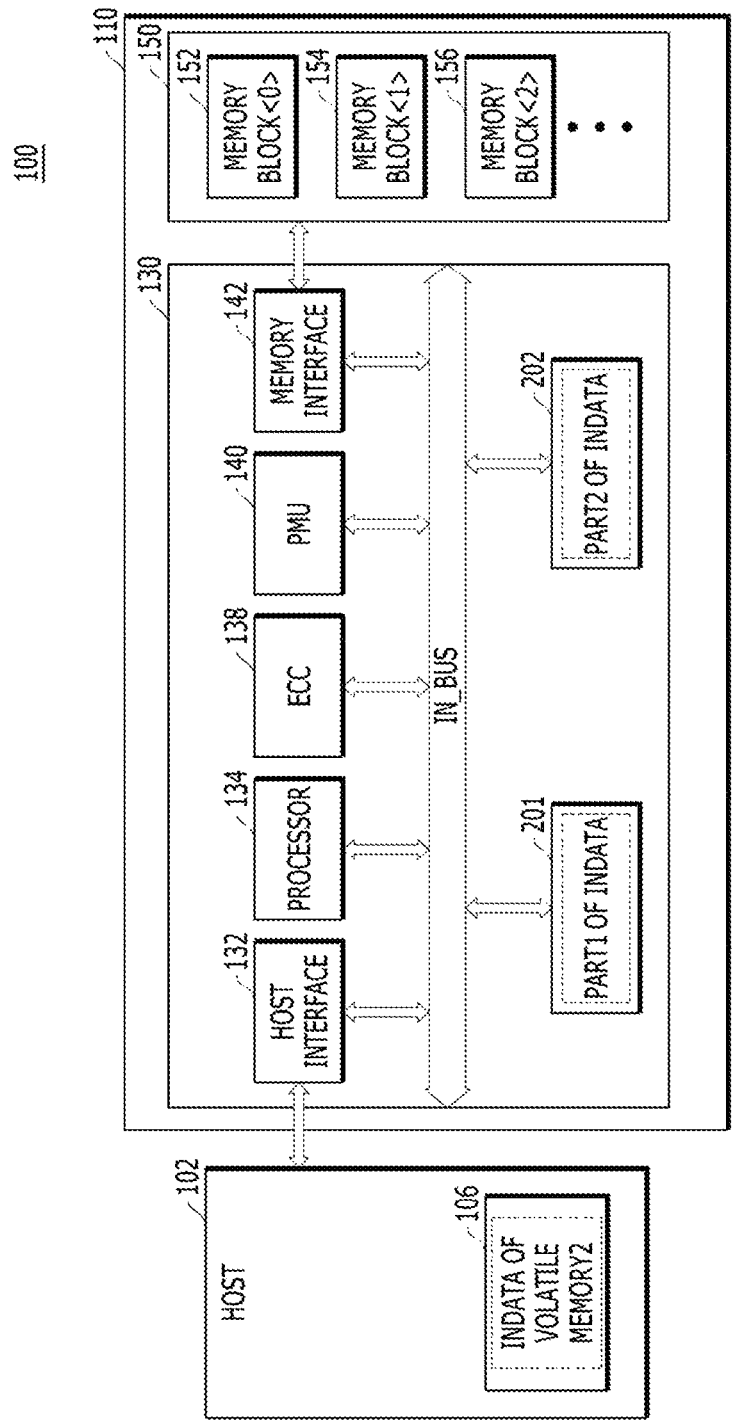
FIG. 2 illustrates a data processing system including a memory system in accordance with an embodiment.

Referring to FIG. 2, a data processing system 100 in accordance with an embodiment of the present disclosure is described. The data processing system 100 may include a host 102 engaged or operating with a memory system 110.

The host 102 may include, for example, a portable electronic device such as a mobile phone, an MP3 player, or a laptop computer, or an electronic device such as a desktop computer, a game player, a television (TV), a projector, or the like.

The host 102 may include at least one operating system (OS), which can generally manage and control functions and operations performed in the host 102. The OS can provide interoperability between the host 102 engaged with the memory system 110 and a user using the memory system 110. The OS may support functions and operations corresponding to the user's requests. By the way of example but not limitation, the OS can be classified into a general operating system or a mobile operating system according to mobility of the host 102. The general operating system may be a personal operating system or an enterprise operating system according to system requirements or a user's environment. The personal operating system, including for example Windows and Chrome, may support services for general purposes. But the enterprise operating systems can be specialized for securing and supporting high performance, including Windows servers, Linux, Unix, and the like. Further, the mobile operating system may include Android, iOS, Windows mobile, or the like. The mobile operating system may support services or functions for mobility (e.g., a power saving function). The host 102 may include a plurality of operating systems. The host 102 may execute multiple operating systems interlocked with the memory system 110, according to a user's requirements. The host 102 may transmit a plurality of commands corresponding to the user's requests into the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above in the examples.

By the way of example but not limitation, the controller 130 and the memory device 150 may be integrated into a single semiconductor device. The controller 130 and memory device 150 may be integrated into an SSD; when the memory system 110 is used as an SSD, the operating speed of the host 102 connected to the memory system 110 can be improved compared to if the host 102 was connected to a hard disk. The controller 130 and the memory device 150 may also be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied to it. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, and the flash memory may be embodied in a two-dimensional or a three-dimensional stack structure.

The controller 130 may control overall operations of the memory device 150, such as read, write, program, and erase operations. For example, the controller 130 may control the memory device 150 in response to a request from the host 102. The controller 130 may provide data read from the memory device 150 to the host 102. The controller 130 may also store data provided by the host 102 into the memory device 150.

The controller 130 may include a host interface (I/F) 132, a processor 134, an error correction code (ECC) component 138, a power management unit (PMU) 140, a memory interface (I/F) 142, and memories 201 and 202, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE). In accordance with an embodiment, the host interface 132 is a component for exchanging data with the host 102, which may be implemented through execution by a processor of firmware called a host interface layer (HIL) stored on a non-transitory computer-readable media.

The ECC component 138 can correct error bits of the data to be processed in (e.g., outputted from) the memory device 150, which may include an ECC encoder and an ECC decoder. Here, the ECC encoder can perform error correction encoding of data to be programmed into the memory device 150 to generate encoded data into which one or more parity or check bits is added and store the encoded data in memory device 150. The ECC decoder can detect and correct errors contained in data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bits which were generated during the ECC encoding process for correcting one or more error bits of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include all circuits, modules, systems or devices for performing the error correction operation based on at least one of the above described codes.

The PMU 140 may manage electrical power provided in the controller 130. In an embodiment, the PMU 140 may selectively supply power to first and second memories 201 and 202 during the sleep mode where entry and exit of the sleep mode is decided by the host 102. For example, during the sleep mode interval, the PMU 140 may supply power to the first memory 201 and suspend power to the second memory 202.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data being provided to or received from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented as a component for exchanging data with the memory device 150 through execution by a processor of firmware, called a Flash Interface Layer (FIL), stored on a non-transitory computer-readable media.

The memories 201 and 202 may support operations performed by the memory system 110 and the controller 130. The memories 201 and 202 may store temporary or transactional data generated by or provided for operations in the memory system 110 and the controller 130. The controller 130 may control the memory device 150 in response to a request from the host 102. The controller 130 may deliver data read from the memory device 150 to the host 102. The controller 130 may store data received from the host 102 within the memory device 150. The memories 201 and 202 may be used to store data used to perform operations such as read operations or program/write operations for the controller 130 and the memory device 150.

The memories 201 and 202 may be respectively implemented as volatile memories. The memories 201 and 202 may be implemented with a static random access memory (SRAM), a dynamic random access memory (DRAM), or both. Although FIG. 2 illustrates the memories 201 and 202 as disposed within the controller 130, embodiments are not limited thereto, and the memories 201 and 202 may be located within or external to the controller 130. For instance, the memories 201 and 202 may be embodied by an external volatile memory having a memory interface transferring data and/or signals between the memories 201 and 202 and the controller 130.

The memories 201 and 202 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memories 201 and 202 may include a program memory, a data memory, a write buffer/cache, a read buffer/cache, a data buffer/cache, a map buffer/cache, and the like.

In the embodiment of FIG. 2, the first memory 201 and the second memory 202 may be configured as memories which are physically separated from each other and included in the memory system 110. In another embodiment, the first memory 201 and the second memory 202 may instead be configured as respective separate regions in one memory divided into two or more regions, unlike the configuration of FIG. 2. However, the first memory 201 and the second memory 202 differ from each other in that respective power thereto is supplied or suspended independently during the sleep mode interval determined by the host 102. In an embodiment, in the sleep mode interval, power may be supplied to the first memory 201 and suspended to the second memory 202. At this time, because the first and second memories 201 and 202 are both volatile memories, data stored in the first memory 201 may be continuously retained while in the sleep mode interval, and the data stored in the second memory 202 may be lost while in the sleep mode interval.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware stored in non-transitory computer readable media to control the overall operations of the memory system 110. Herein, the firmware may be referred to as a flash translation layer (FTL). The FTL may operate as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address received from the host 102 to a physical address of the memory device 150 using the map data. Because of the address mapping operation, the memory device 150 may look like a general storage device to perform a read or write operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) to take into account characteristic of a flash memory device. Further, the controller 130 may store map data of the new data into the FTL.

For example, when performing an operation requested by the host 102 in the memory device 150, the controller 130 uses the processor 134 implemented in a microprocessor or central processing unit (CPU) or the like. The processor 134 engaged with the memory device 150 can handle instructions or commands corresponding to command received from the host 102. The controller 130 can perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 using the processor 134. By way of example but not limitation, the background operation for the memory device 150 may include copying and storing data stored in a memory block among the memory blocks 152, 154, 156 in the memory device 150 to another memory block, e.g., a garbage collection (GC) operation. The background operation may include moving or swapping data stored in at least one of the memory blocks 152, 154, 156 into at least another of the memory blocks 152, 154, 156, e.g., a wear leveling (WL) operation. During a background operation, the controller 130 may use the processor 134 to store the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation that may be performed by the processor 134.

In the memory system 110, the controller 130 performs a plurality of command operations corresponding to a plurality of commands entered from the host 102. For example, when performing a plurality of program operations corresponding to a plurality of program commands, a plurality of read operations corresponding to a plurality of read commands, and a plurality of erase operations corresponding to a plurality of erase commands sequentially, randomly, or alternatively, the controller 130 can determine which channel(s) or way(s) among a plurality of channels (or ways) connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Meanwhile, a program operation, a read operation and an erase operation of the controller 130 will be described below.

First, the controller 130 may store program data corresponding to a program command received from the host 102 in a buffer/cache included in the memories 201 and 202 of the controller 130, and then store the data stored in the buffer/cache in the memory blocks 152, 154 and 156 included in the memory device 150. Also, the controller 130 may update map data corresponding to the program operation, and then may store the updated map data in the memory blocks 152, 154 and 156 included in the memory device 150.

When a read command is received from the host 102, the controller 130 may read data corresponding to the read command from the memory device 150 by checking map data of the data corresponding to the read command, may store the read data in the buffer/cache included in the memories 201 and 202 of the controller 130, and then may provide the data stored in the buffer/cache to the host 102.

When an erase command is received from the host 102, the controller 130 may perform an erase operation of checking a memory block corresponding to the erase command, erasing data stored in the checked memory block, updating map data corresponding to the erased data, and then storing the updated map data in the memory blocks 152, 154 and 156 included in the memory device 150.

Map data may include logical/physical (L2P: logical to physical) address information and physical/logical (P2L: physical to logical) address information on data stored in memory blocks by a program operation.

Data corresponding to a command may include user data and metadata. The metadata may include map data generated in the controller 130 that corresponds to user data is stored in the memory device 150. Also, the metadata may include information on command data corresponding to a command received from the host 102, information on a command operation corresponding to the command, information on the memory blocks of the memory device 150 for which the command operation is to be performed, and information on map data corresponding to the command operation. In other words, the metadata may include information and data for the command operation, other than user data corresponding to the command received from the host 102.

That is to say, when a write command is received from the host 102, the controller 130 performs a program operation corresponding to the write command. At this time, the controller 130 may store user data corresponding to the write command in at least one among the memory blocks 152, 154 and 156 of the memory device 150 (for example, empty memory blocks, open memory blocks or free memory blocks for which an erase operation is performed, among the memory blocks). Also, the controller 130 may store logical to physical address mapping information (an L2P map) and physical to logical address mapping information (a P2L map) regarding the user data stored in memory blocks in empty memory blocks, open memory blocks, or free memory blocks among the memory blocks of the memory device 150, in the form of a map table or a map list.

User data to be stored in the memory device 150 may be divided by the unit of a segment having a preset size. The preset size may be the same as a minimum data size required for the memory system 110 to interoperate with the host 102. According to an embodiment, a size of a data segment as the unit of user data may be determined according to a configuration and a control method in the memory device 150. While storing data segments of user data in the memory blocks of the memory device 150, the controller 130 may generate or update a map address corresponding to a stored data segment. When meta segments each corresponding to the unit of metadata including a map address (for example, logical to physical (L2P) segments and physical to logical (P2L) segments as map segments of map data) are generated by the controller 130 or map segments stored in memory blocks are loaded to the memories 201 and 202 and are then updated, the map segments may be stored in the memory blocks of the memory device 150.

Referring to FIGS. 1 and 2, the memory system 110 may generate the internal data IN DATA during processing of an operation on the memory device 150. At this time, the internal data INDATA may be meta data which is generated in the memory system 110 because the meta data is required for performing a data write/read operation between the host 102 and the memory device 150. For example, map data including L2P (Logical to Physical) address mapping information and P2L (Physical to Logical) address mapping information on data stored in the memory blocks 152, 154 and 156 may be included in the internal data INDATA. Furthermore, read/write/erase count data which are required to ensure the reliability of data stored in the memory blocks 152, 154 and 156 or to decide a time point of a background operation may be included in the internal data INDATA. On the other hand, write/read data which are directly inputted from the host 102, stored in the memory blocks 152, 154 and 156, and then outputted to the host 102 may not be included in the internal data INDATA, because the write/read data are not generated by the memory system 110.

The memory system 110 may store the internal data INDATA in at least any one of the first and second memories 201 and 202. For example, as illustrated in the drawings, a first part PART1 of the internal data IN DATA may be stored in the first memory 201, and a second part PART2 of the internal data INDATA may be stored in the second memory 202.

When no write or read operation is scheduled to be performed on the memory system 110 for a predetermined time or more, the host 102 may request the memory system 110 to enter the sleep mode, in order to reduce power consumption of the memory system 110.

When the request for the entry into the sleep mode is received from the host 102, the memory system 110 may output the second part PART2 of the internal data INDATA stored in the second memory 202 to the host 102, and then suspend (that is, stop supplying) power to the second memory 202.

After requesting the memory system 110 to enter the sleep mode, the host 102 may store the second part PART2 of the internal data INDATA received from the memory system 110 in the internal memory 106.

The host 102 may at a later time request the memory system 110, which has entered the sleep mode, to exit from the sleep mode. At this time, the host 102 may output the second part PART2 of the internal data INDATA stored in the internal memory 106 to the memory system 110 while requesting the memory system 110 to exit from the sleep mode.

When the request for the exit from the sleep mode is received from the host 102, the memory system 110 may supply power to the second memory 202. Then the memory system 110 may store the second part PART2 of the internal data IN DATA in the second memory 202, the second part PART2 of the internal data INDATA being received with the request for the exit from the sleep mode from the host 102.

Figure 3:
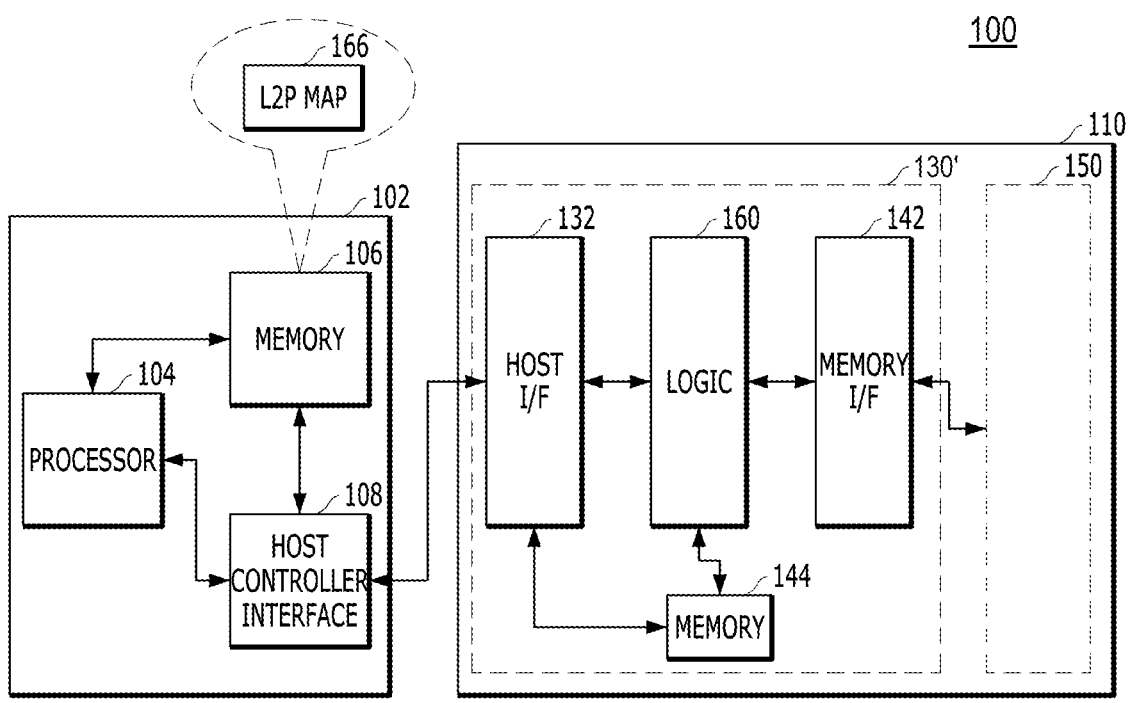
FIG. 3 illustrates configurations of a host and the memory system in the data processing system in accordance with the present embodiment.

FIG. 3 illustrates configurations of the host 102 and the memory system 110 in the data processing system 100 in accordance with an embodiment of the disclosure.

Figure 4:
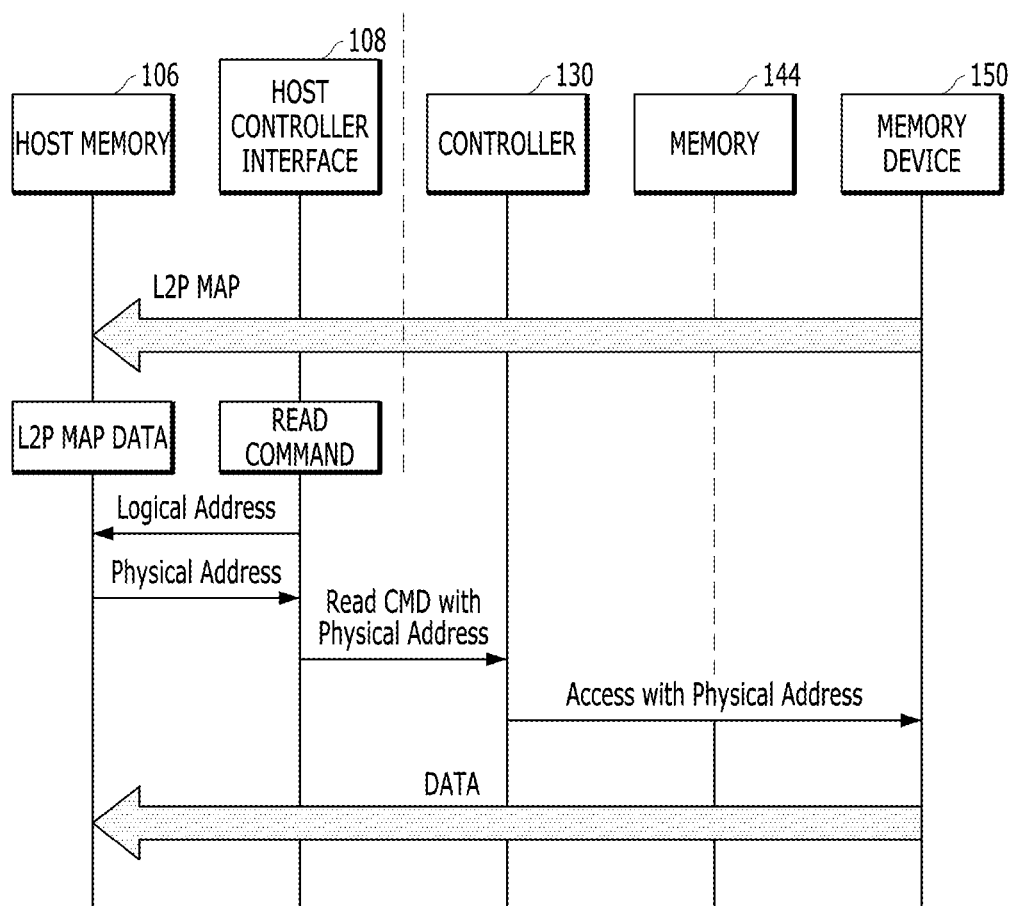
FIG. 4 illustrates a read operation of the host and the memory system in the data processing system in accordance with the present embodiment.

FIG. 4 illustrates a read operation of the host and the memory system in the data processing system in accordance with the embodiment of the disclosure.

Referring to FIG. 3, the host 102 may include a processor 104, memory 106, and a host controller interface 108. The memory system 110 may include a controller 130' and a memory device 150. Herein, the controller 130' and the memory device 150 described with reference to FIG. 3 may generally correspond to the controller 130 and the memory device 150 described with reference to FIG. 2.

Hereinafter, a difference between the controller 130' and the memory device 150 shown in FIG. 3 and the controller 130 and the memory device 150 shown in FIG. 2, which can technically be distinguished, is mainly described. Particularly, a logic block 160 in the controller 130 may correspond to the flash translation layer (FTL) described with reference to FIG. 2. However, according to an embodiment, the logic block 160 in the controller 130' may perform an additional function not described in the flash translation layer (FTL) described with reference to FIG. 2.

The host 102 may include the processor 104, which has a higher performance than that of the memory system 110, and the memory 106 which is capable of storing a larger amount of data than the memory 144 of the memory system 110 that cooperates with the host 102. The processor 104 and the memory 106 in the host 102 can have an advantage in terms of space and upgradability. For example, the processor 104 and the memory 106 can have less of a space limitation than the processor 134 and the memory 144 in the memory system 110. The processor 104 and the memory 106 can be replaceable for upgrading their performance, which is distinguishable from the processor 134 and the memory 144 in the memory system 110. In an embodiment, the memory system 110 can utilize the resources possessed by the host 102 in order to increase the operation efficiency of the memory system 110.

As an amount of data which can be stored in the memory device 150 of the memory system 110 increases, an amount of metadata corresponding to the data stored in the memory system 110 also increases. When storage capability used to load the metadata in the memory 144 of the controller 130 is limited or restricted, the increase in an amount of loaded metadata may cause an operational burden on operations of the controller 130. For example, because of limitation of space or region allocated for metadata in the memory 144 of the controller 130, a part, but not all, of the metadata may be loaded. If the loaded metadata does not include specific metadata for a physical location to which the host 102 has requested to access, the controller 130 must store the loaded metadata back into the memory device 150 if some of the loaded metadata has been updated, as well as load the specific metadata for the physical location to which the host 102 has requested to access. These operations should be performed so that the controller 130 can perform a read operation or a write operation required by the host 102, and may degrade performance of the memory system 110.

Storage capability of the memory 106 included in the host 102 may be tens or hundreds of times larger than that of the memory 144 included in the controller 130. The memory system 110 may transfer a metadata 166 used by the controller 130 to the memory 106 in the host 102 so that at least some part of the memory 106 in the host 102 may be accessed by the memory system 110. The at least some part of the memory 106 can be used as a cache memory for address translation required for reading or writing data in the memory system 110. In this case, the host 102 translates a logical address into a physical address based on the metadata 166 stored in the memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address received from the host 102. In this case, an overhead (e.g., operational burden) of the controller 130 loading metadata from the memory device 150 for the address translation may be eliminated, and operational efficiency of the memory system 110 can be enhanced.

On the other hand, even if the memory system 110 transmits the metadata 166 to the host 102, the memory system 110 can control mapping information based on the metadata 166 such as metadata generation, erase, update, and the like. The controller 130 in the memory system 110 may perform a predetermined operation according to an operation state of the memory device 150 and may determine a physical address, i.e., which physical location in the memory device 150 data transferred from the host 102 is to be stored. Because a physical address of data stored in the memory device 150 may be changed and the host 102 has not yet recognized the changed physical address, the memory system 110 may take the initiative to control the metadata 166.

While the memory system 110 controls metadata used for the address translation, it can be determined that the memory system 110 needs to modify or update the metadata 166 previously transmitted to the host 102. The memory system 110 can send a signal including metadata to the host 102 to request the update of the metadata 166 stored in the host 102. The host 102 may update the stored metadata 166 in the memory 106 in response to a request received from the memory system 110. This allows the metadata 166 stored in the memory 106 in the host 102 to be kept up to date so that, even though the host controller interface 108 uses the metadata 166 stored in the memory 106, a logical address is translated properly into a physical address and the translated physical address is transmitted along with the logical address to the memory system 110.

Meanwhile, the controller 130 in the memory system 110 can control (e.g., create, delete, update, etc.) the logical/physical information item or the physical/logical information item, and store either the logical information item or the physical information item to the memory device 150. Because the memory 106 in the host 102 is a type of volatile memory, the metadata 166 stored in the memory 106 may disappear when an event such as interruption of power supply to the host 102 and the memory system 110 occurs. Accordingly, the controller 130 in the memory system 110 might not only keep the latest state of the metadata 166 stored in the memory 106 of the host 102, but also store the latest state of the logical/physical information item or the physical/logical information item included in the metadata 166 in the memory device 150.

Referring to FIGS. 3 and 4, an operation requested by the host 102 to read data stored in the memory system 110 is described when the metadata 166 is stored in the memory 106 of the host 102.

Power is supplied to the host 102 and the memory system 110, and then the host 102 and the memory system 110 can be engaged with each other. When the host 102 and the memory system 110 cooperate, the logical-to-physical address mapping metadata (L2P MAP) stored in the memory device 150 can be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the metadata (L2P MAP) stored in the host memory 106. Based on the metadata (L2P MAP) stored in the host memory 106, the host controller interface 108 can determine the physical address corresponding to the logical address. The host controller interface 108 then carries out an address translation for the logical address associated with the read command.

The host controller interface 108 transfers the read command (Read CMD) with the logical address as well as the physical address to the controller 130 of the memory system 110. The controller 130 can access the memory device 150 based on the physical address entered with the read command. Data stored at a location corresponding to the physical address in the memory device 150 can be transferred to the host memory 106 in response to the read command (Read CMD).

An operation of reading data stored in the memory device 150 including a nonvolatile memory may take more time than an operation of reading data stored in the host memory 106 or the like which is a volatile memory. In the above-described operation for handling the read command (Read CMD), the controller 130 may skip or omit an address translation corresponding to the logical address entered from the host 102 (e.g., searching for and recognizing a physical address associated with the logical address). For example, because the address translation was performed in the host 102, the controller 130 might not have to load metadata from the memory device 150 or replace the metadata stored in the memory 144 because the controller 130 cannot find the metadata for the address translation in the memory 144. This allows the memory system 110 to perform a read operation requested by the host 102 more quickly.

The operation of the host 102 and the memory system 110, which has been described with reference to FIGS. 3 and 4 may be an operation of the host 102 and the memory system 110 which is performed in a normal mode. That is, the operation of the host 102 and the memory system 110 which has been described with reference to FIGS. 3 and 4 may indicate an operation of storing the meta data 166 generated by the memory system 110 in the internal memory 106 included in the host 102 and managing the meta data 166 during an operation in which the host 102 requests the memory system 110 to write specific data or requests the memory system 110 to read specific data stored therein. In such a normal mode, the memory system 110 may perform a number of operations requested by the host. Thus, the memory system 110 may be allowed to use a relatively large amount of power in the normal mode.

On the other hand, the host 102 and the memory system 110 may enter the sleep mode. That is, when a time during which the host 102 does not need to request the memory system 110 to write or read specific data is expected to be sufficiently long, then as described with reference to FIGS. 1 and 2, the host 102 may request the memory system 110 to enter the sleep mode. In the sleep mode interval, the memory system 110 does not perform a separate operation other than to prepare for exit from the sleep mode. Therefore, the memory system 110 may not be allowed to use a large amount of power in the sleep mode interval. For this reason, the memory system 110 may perform various operations for minimizing power consumption in the sleep mode interval. In an embodiment, the memory system 110 may perform an operation of suspending power to a part of the internal volatile memory (such as the second memory 202 in FIG. 2), which would otherwise continuously consume power in the sleep mode interval. At this time, the volatile memories 201 and 202 within the memory system 110 may lose data stored therein, when power is suspended. Therefore, when the request for the sleep mode entry is received from the host 102, the memory system 110 may move the data which have been stored in a part of the volatile memory to another region, and then suspend power to that part of the volatile memory.

As described with reference to FIGS. 3 and 4, the memory system 110 may transfer the meta data 166 to the host 102 such that the meta data 166 is stored in the internal memory 106 of the host 102. FIGS. 3 and 4 illustrate only map data as the meta data 166 transferred from the memory system 110 to the host 102. However, this is only an embodiment, and the meta data 166 does not need to be limited to the map data, because the host 102 does not decide whether to store the meta data 166 transferred by the memory system 110 in the internal memory 106 by checking components of the meta data 166. Thus, when the request for the sleep mode entry is received from the host 102, the memory system 110 may transfer the data stored in a part of the internal volatile memory to the host 102 so that the data are stored in the internal memory 106 of the host 102. Then, the memory system 110 may suspend power to that part of the volatile memory, i.e. the operation described with reference to FIGS. 1 and 2.

FIGS. 5A to 5E illustrate sleep mode entry and exit operations in a data processing system in accordance with the present embodiment.

The sleep mode entry and exit operations of the data processing system 100, which is described with reference to FIGS. 5A and 5B, may be a detailed version of the sleep mode entry and exit operations of the data processing system 100 described with reference to FIGS. 1 and 2. Thus, the following descriptions will be focused on contents which can technically distinguish between the sleep mode entry and exit operations to be described with reference to FIGS. 5A and 5B and the operations described with reference to FIGS. 1 and 2.

In an embodiment, the host 102 may generate a sleep command SLEEP COMMAND and transfer the sleep command SLEEP COMMAND to the memory system 110 to request the memory system 110 to enter the sleep mode.

When the sleep command SLEEP COMMAND is received from the host 102, the memory system 110 may check the size of internal data INDATA stored in the second volatile memory VOLATILE MEMORY2 within the memory system 110. That is, the memory system 110 may compare the size of the internal data INDATA stored in the second volatile memory VOLATILE MEMORY2 with a reference size REF SIZE. This is because, in an embodiment, the size of data which the memory system 110 can transfer to the host 102 at one time in response to the sleep command SLEEP COMMAND may be limited to a prearranged amount. That is, in order to store the data transferred from the memory system 110 in the internal memory INTERNAL MEMORY of the host 102, a protocol prearranged between the host 102 and the memory system 110 needs to be used as it is, and the prearranged protocol may include the size of data which can be transferred at one time (for example, in a single message). The reference size REF SIZE may correspond to the size of data which the memory system 110 can transfer to the host 102 at one time in response to the sleep command SLEEP COMMAND.

Therefore, when the sleep command SLEEP COMMAND is received from the host 102, the memory system 110 may decide whether to divide the internal data INDATA stored in the second volatile memory VOLATILE MEMORY2 according to the comparison result between the size of the internal data INDATA stored in the second volatile memory VOLATILE MEMORY2 and the reference size REF SIZE. When the size of the internal data INDATA stored in the second volatile memory VOLATILE MEMORY2 is equal to or less than the reference size REF SIZE (SIZE OF INDATA<=REF SIZE), the memory system 110 may not divide the internal data IN DATA stored in the second volatile memory VOLATILE MEMORY2. On the other hand, when the size of the internal data INDATA stored in the second volatile memory VOLATILE MEMORY2 exceeds the reference size REF SIZE (SIZE OF INDATA>REF SIZE), the memory system 110 may divide the internal data INDATA stored in the second volatile memory VOLATILE MEMORY2.

Figure 5A:
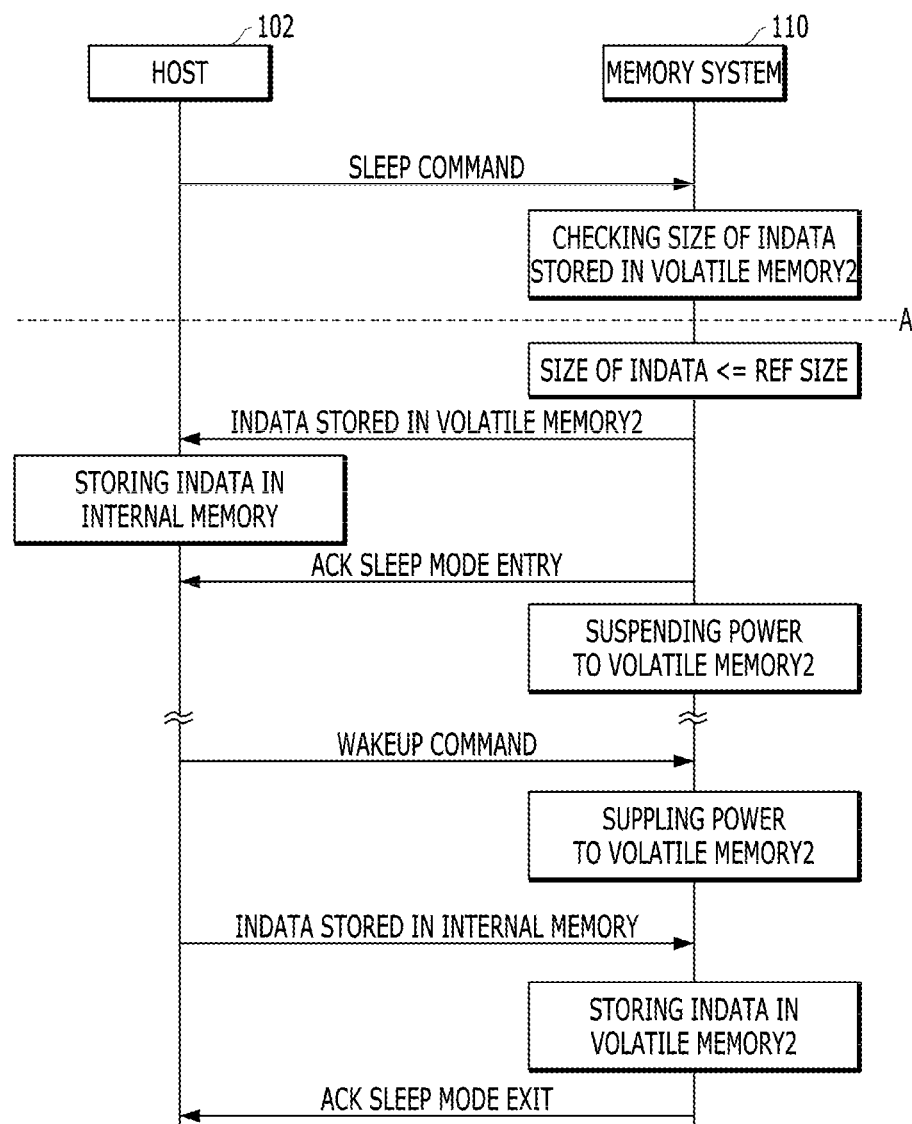
FIGS. 5A, 5B, 5C, 5D, and 5E illustrate sleep mode entry and exit operations in the data processing system in accordance with the present embodiment.

FIG. 5A illustrates the memory system 110 entering and exiting the sleep mode when the size of the internal data INDATA stored in the second volatile memory VOLATILE MEMORY2 is equal to or less than the reference size REF SIZE (SIZE OF INDATA<=REF SIZE).

First, the memory system 110 may output the internal data INDATA stored in the second volatile memory VOLATILE MEMORY2 to the host 102, and then acknowledge entry into the sleep mode to the host 102 (ACK SLEEP MODE ENTRY) and enter the sleep mode.

While in the sleep mode, the memory system 110 may supply power to a first volatile memory device therein, and suspend power to the second volatile memory VOLATILE MEMORY2. As a result, the second volatile memory VOLATILE MEMORY2 to which power is suspended during the sleep mode may lose all of the internal data INDATA stored therein, and the first volatile memory device to which power is supplied may retain the data stored therein.

The host 102 may store the internal data INDATA received from the memory system 110 in the internal memory INTERNAL MEMORY of the host 102 during the time period when the memory system 110 is entering, in, and exiting the sleep mode.

To request the memory system 110, which has entered the sleep mode, to exit from the sleep mode, the host 102 may generate a wakeup command WAKEUP COMMAND and transfer the wakeup command WAKEUP COMMAND to the memory system 110. The host 102 may include the internal data INDATA stored in the internal memory INTERNAL MEMORY in the wakeup command WAKEUP COMMAND, and output the wakeup command WAKEUP COMMAND with the internal data INDATA to the memory system 110.

Thus, when the wakeup command WAKEUP COMMAND is received from the host 102, the memory system 110 may exit from the sleep mode and supply power POWER to the second volatile memory VOLATILE MEMORY2 to which power has been suspended in the sleep mode interval. Then, the memory system 110 may store the internal data INDATA received with the wakeup command WAKEUP COMMAND from the host 102 into the second volatile memory VOLATILE MEMORY2, and transfer an acknowledgment for the exit from the sleep mode (ACK SLEEP MODE EXIT) to the host 102.

Figure 5B:
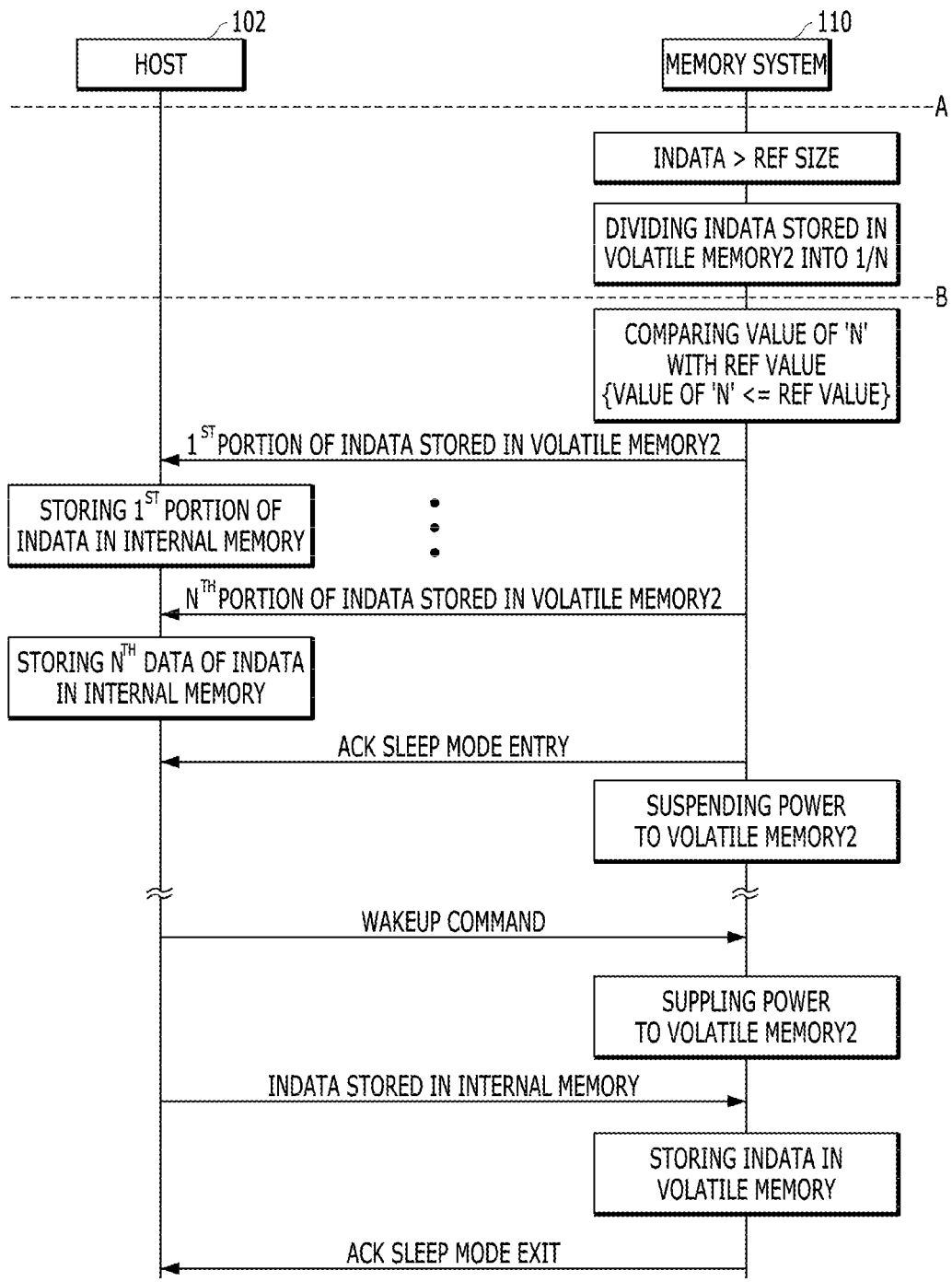

FIG. 5B illustrates an operation in which the memory system 110 enters and exits from the sleep mode when the size of the internal data INDATA stored in the second volatile memory VOLATILE MEMORY2 within the memory system 110 exceeds the reference size REF SIZE (SIZE OF INDATA>REF SIZE), on the contrary to the descriptions of FIG. 5A. Operations above a line A in the operation of FIG. 5B may be performed in the same manner as shown above the line A in FIG. 5A.

First, the memory system 110 may divide the internal data INDATA stored in the second volatile memory VOLATILE MEMORY2 into N portions of data (DIVIDING INDATA STORED IN VOLATILE MEMORY2 INTO N), where N may be a natural number equal to or more than 2. Then, the memory system 110 may compare the value of N with a reference value REF VALUE (COMPARING VALUE OF 'N' WITH REF VALUE). That is because the entire size of data which the memory system 110 can transfer to the host 102 in response to the sleep command SLEEP COMMAND may have a prearranged limit. That is, in order to store the data transferred from the memory system 110 in the internal memory INTERNAL MEMORY of the host 102, a protocol prearranged between the host 102 and the memory system 110 needs to be used as it is, and the prearranged protocol may include a limit on the entire size of data which can be transferred. At this time, the size may correspond to the reference value REF VALUE capable of defining the entire size of data which the memory system 110 can transfer to the host 102 in response to the sleep command SLEEP COMMAND. For reference, as described above, the size of data which the memory system 110 can transfer to the host 102 at a time in response to the sleep command SLEEP COMMAND has been defined as the reference size REF SIZE. Furthermore, the reason to divide the internal data INDATA stored in the second volatile memory VOLATILE MEMORY2 into N portions of data is that the size of the internal data INDATA is larger than the reference size REF SIZE. Therefore, suppose that the internal data INDATA is divided by the reference size REF SIZE when the internal data INDATA is divided into N portions of data. Therefore, the reference value REF VALUE compared with N may define the entire size of data which the memory system 110 can transfer to the host 102 in response to the sleep command SLEEP COMMAND.

FIG. 5B illustrates the case in which the value of N is equal to or less than the reference value REF VALUE (VALUE OF 'N'<=REF VALUE).

Specifically, when the value of N is equal to or less than the reference value REF VALUE (VALUE OF 'N'<=REF VALUE), the memory system 110 may sequentially output the N portions of divided internal data INDATA from a first portion $1^{ST}$ PORTION OF INDATA to an $N^{th}$ portion $N^{TH}$ PORTION OF INDATA to the host 102 as responses to the sleep command SLEEP COMMAND, respectively, and then acknowledge the entry into the sleep mode to the host 102 (ACK SLEEP MODE ENTRY) and enter the sleep mode.

While entering the sleep mode, the memory system 110 may supply power to the first volatile memory device therein, and suspend power to the second volatile memory VOLATILE MEMORY2. At this time, the second volatile memory VOLATILE MEMORY2 to which power is suspended during the sleep mode may lose all of the internal data INDATA stored therein, and the first volatile memory device to which power is supplied may retain the data stored therein.

The host 102 may store the internal data INDATA received from the memory system 110 in the internal memory INTERNAL MEMORY of the host 102 between the first time point that the host 102 generates the sleep command SLEEP COMMAND and outputs the sleep command SLEEP COMMAND to the memory system 110 until after the memory system 110 exits the sleep mode.

To request the memory system 110, which has entered the sleep mode SLEEP MODE, to exit from the sleep mode, the host 102 may generate the wakeup command WAKEUP COMMAND and transfer the wakeup command WAKEUP COMMAND to the memory system 110. The host 102 may include the internal data INDATA stored in the internal memory INTERNAL MEMORY in the wakeup command WAKEUP COMMAND, and output the wakeup command WAKEUP COMMAND with the internal data IN DATA to the memory system 110.

Thus, when the wakeup command WAKEUP COMMAND is received from the host 102, the memory system 110 may exit from the sleep mode, and supply power to the second volatile memory VOLATILE MEMORY2 to which power has been suspended during the sleep mode interval. Then, the memory system 110 may store the internal data INDATA received with the wakeup command WAKEUP COMMAND from the host 102 in the second volatile memory VOLATILE MEMORY2, and transfer an acknowledgment for the exit from the sleep mode (ACK SLEEP MODE EXIT) to the host 102.

Figure 5C:
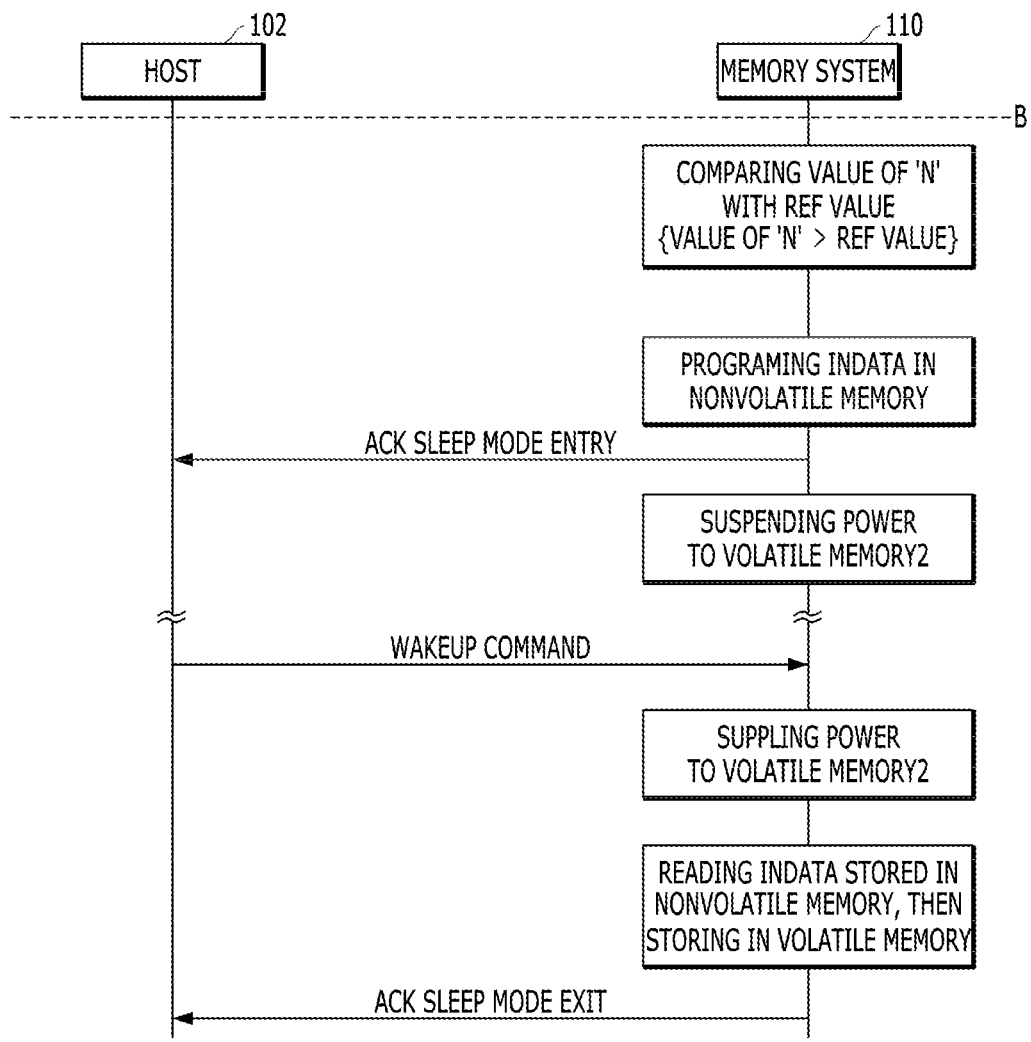

FIG. 5C illustrates the case in which the value of N exceeds the reference value REF VALUE (VALUE OF 'N'>REF VALUE), on the contrary to the descriptions of FIG. 5B. Operations above a line B in the operation of FIG. 5C may be performed in the same manner as shown above the line B in FIG. 5B (including the operations shown above the line A in FIG. 5A).

Specifically, when the value of N exceeds the reference value REF VALUE (VALUE OF 'N'>REF VALUE), the memory system 110 may program the internal data INDATA stored in the second volatile memory VOLATILE MEMORY2 to a nonvolatile memory device NONVOLATILE MEMORY, and then acknowledge an entry into the sleep mode to the host 102 (ACK SLEEP MODE ENTRY) and enter the sleep mode. That is, the memory system 110 may not output any data to the host 102 in response to the sleep command SLEEP COMMAND, but may acknowledge the entry into the sleep mode to the host 102. Because the host 102 receives no data from the memory system 110 in response to the sleep command SLEEP COMMAND, the host 102 does not store any corresponding data in the internal memory INTERNAL MEMORY.

While in the sleep mode, the memory system 110 may supply power to the first volatile memory device therein, and suspend power to the second volatile memory VOLATILE MEMORY2. At this time, the second volatile memory VOLATILE MEMORY2 to which power is suspended during the sleep mode may lose all of the internal data INDATA stored therein, and the first volatile memory device to which power is supplied may retain the data stored therein.

To request the memory system 110 which has entered the sleep mode to exit from the sleep mode SLEEP MODE, the host 102 may generate the wakeup command WAKEUP COMMAND and transfer the wakeup command WAKEUP COMMAND to the memory system 110. At this time, since the host 102 has never received any data from the memory system 110 as a response to the sleep command SLEEP COMMAND, the host 102 may not include data in the wakeup command WAKEUP COMMAND outputted to the memory system 110.

When the wakeup command WAKEUP COMMAND is received from the host 102, the memory system 110 may exit from the sleep mode, and supply power to the second volatile memory VOLATILE MEMORY2 to which power has been suspended during the sleep mode interval. Then, the memory system 110 may read the internal data INDATA, which has been programmed to the nonvolatile memory device NONVOLATILE MEMORY at the sleep mode entry time, from the nonvolatile memory device NONVOLATILE MEMORY and store the read data in the second volatile memory VOLATILE MEMORY2, and transfer an acknowledgment for the exit from the sleep mode (ACK SLEEP MODE EXIT) to the host 102.

Figure 5D:
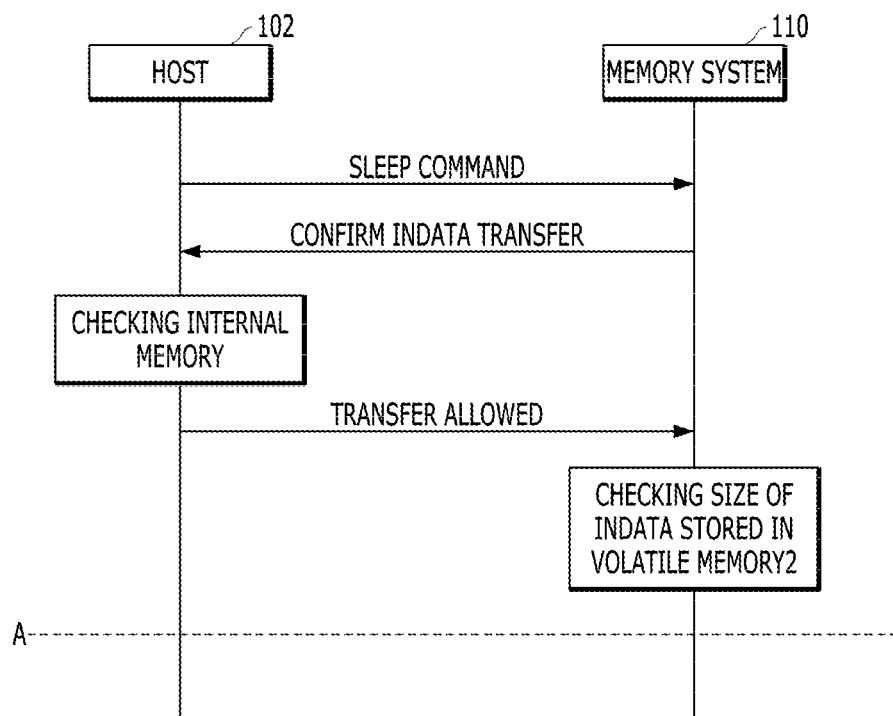

Referring to FIG. 5D, in an embodiment, when the sleep command SLEEP COMMAND is received from the host 102, the memory system 110 may request confirmation from the host 102 that transfer of the internal data IN DATA to the host 102 is supported (CONFIRM INDATA TRANSFER) before transferring the internal data INDATA stored in the second volatile memory VOLATILE MEMORY2 to the host 102.

The host 102 may check the state of the internal memory INTERNAL MEMORY when a request to confirm support for the transfer of the internal data INDATA is received from the memory system 110 between the first time point that the host 102 generates the sleep command SLEEP COMMAND and outputs the sleep command SLEEP COMMAND to the memory system 110 and the second time point that the acknowledgment for the entry into the sleep mode is received from the memory system 110 (CHECKING INTERNAL MEMORY). According to a result obtained by checking the state of the internal memory INTERNAL MEMORY, the host 102 may allow the memory system 110 to transfer the internal data INDATA (TRANSFER ALLOWED), or not allow the memory system 110 to transfer the internal data INDATA (TRANSFER NOT ALLOWED).

When the host 102 confirms to the memory system 110 (TRANSFER ALLOWED) that the memory system 110 is allowed to transfer the internal data INDATA to the host 102, the memory system 110 may output the internal data INDATA stored in the second volatile memory VOLATILE MEMORY2 to the host 102 by using the operations described with reference to FIGS. 5A to 5C as it is. That is, the operations described with reference to FIGS. 5A to 5C may be applied as an operation below a line A in the operation of FIG. 5D.

Figure 5E:
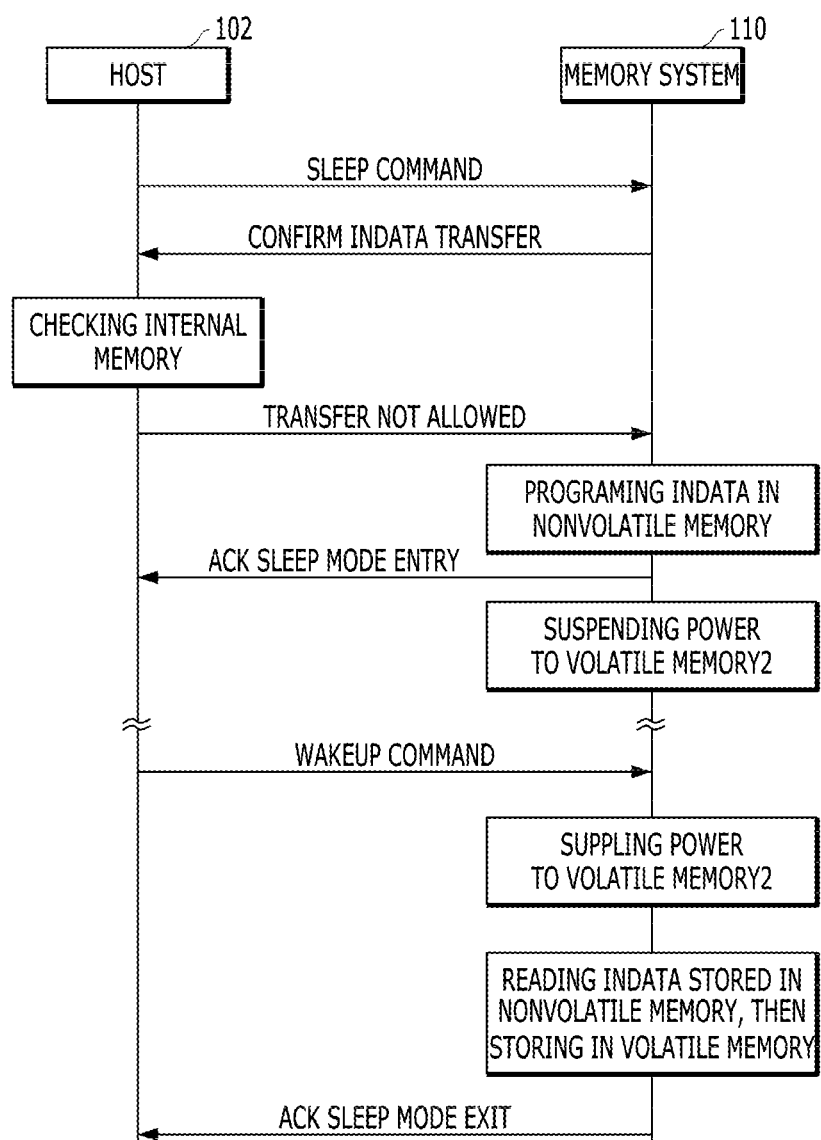

FIG. 5E illustrates the case in which the host 102 indicates to the memory system 110 that memory system 110 is not allowed to transfer the internal data to the host 102 (TRANSFER NOT ALLOWED), to the contrary to the case of FIG. 5D.

When not allowed to transfer the internal data INDATA to the host 102, the memory system 110 may program the internal data INDATA stored in the second volatile memory VOLATILE MEMORY2 to the nonvolatile memory device NONVOLATILE MEMORY, and then acknowledge an entry into the sleep mode to the host 102 (ACK SLEEP MODE ENTRY) and enter the sleep mode. That is, the memory system 110 may not output any data to the host 102 in response to the sleep command SLEEP COMMAND, but acknowledge the entry into the sleep mode to the host 102. Furthermore, since the host 102 receives no data from the memory system 110 in response to the sleep command SLEEP COMMAND, the host 102 may not store such data in the internal memory INTERNAL MEMORY.

While in the sleep mode, the memory system 110 may supply power to the first volatile memory device therein, and suspend power to the second volatile memory VOLATILE MEMORY2. During this time, the second volatile memory VOLATILE MEMORY2 to which power is suspended may lose all of the internal data IN DATA stored therein, and the first volatile memory device to which power is supplied may retain the data stored therein.

To request the memory system 110 which has entered the sleep mode to exit from the sleep mode, the host 102 may generate the wakeup command WAKEUP COMMAND and transfer the wakeup command WAKEUP COMMAND to the memory system 110. At this time, since the host 102 has never received any data from the memory system 110 in response to the sleep command SLEEP COMMAND, the host 102 may not include data in the wakeup command WAKEUP COMMAND outputted to the memory system 110.

When the wakeup command WAKEUP COMMAND is received from the host 102, the memory system 110 may exit from the sleep mode, and supply power to the second volatile memory VOLATILE MEMORY2 to which power has been suspended in the sleep mode interval. Then, the memory system 110 may read the internal data INDATA, which has been programmed to the nonvolatile memory device NONVOLATILE MEMORY at the sleep mode entry time, from the nonvolatile memory device NONVOLATILE MEMORY and store the read data in the second volatile memory VOLATILE MEMORY2, and transfer an acknowledgment for the exit from the sleep mode (ACK SLEEP MODE EXIT) to the host 102.

In accordance with the above-described embodiments, when the memory system is controlled to enter the sleep mode, the internal data stored in the volatile memory device of the memory system to which power is suspended in the sleep mode may be transferred to the host and stored in the internal memory of the host. Furthermore, when the memory system is controlled to exit from the sleep mode, the internal data stored in the internal memory of the host may be received from the host and stored in the volatile memory of the memory system. This operation can significantly reduce the entry and exit latency of the sleep mode, compared to the case in which the internal data stored in the volatile memory device of the memory system are programmed to/read from the nonvolatile memory device in the sleep mode entry/exit interval. Through this operation, the operation performance of the memory system can be improved.

In accordance with the embodiments, the apparatus may have the following effects.

When controlling the memory system to enter the sleep mode, the data processing system may transfer, to the host, the internal data stored in the volatile memory of the memory system, where the volatile memory will have power suspended in the sleep mode, and store the internal data in the internal memory of the host. Furthermore, when controlling the memory system to exit from the sleep mode, the data processing system may receive the internal data stored in the internal memory of the host, and store the internal data in the volatile memory of the memory system, where the volatile memory had power restored as part of exiting the sleep mode. Through this operation, the entry and exit latencies of the sleep mode can be significantly reduced compared to when the internal data stored in the volatile memory of the memory system are programmed to and read from the nonvolatile memory at entry and exit, respectively, of the sleep mode. Therefore, the operation performance of the memory system can be improved.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a nonvolatile memory device;
   a first volatile memory device to which power is supplied in a sleep mode;
   a second volatile memory device to which power is suspended in the sleep mode; and
   a controller configured to store internal data in at least any one of the first and second volatile memory devices, the internal data being generated during processing of an operation of the nonvolatile memory device,
   wherein when a sleep command is received from a host external to the memory system, the controller outputs the internal data stored in the second volatile memory device to the host in response to the sleep command, and then transfers an acknowledgement for an entry into the sleep mode to the host and enters the sleep mode, and
   wherein the controller retains the internal data stored in the first volatile memory device in the sleep mode.

2. The memory system of claim 1, wherein when the sleep command is received from the host, the controller performs a comparison of the size of the internal data stored in the second volatile memory device with the size of data which can be transferred at one time in response to the sleep command, and determines whether to divide the internal data based on a result of the comparison.

3. The memory system of claim 2, wherein when the result of the comparison indicates that the size of the internal data stored in the second volatile memory device exceeds the size of data which can be transferred at one time in response to the sleep command, the controller divides the internal data stored in the second volatile memory device into N portions of data, and sequentially outputs the divided internal data from a first portion to an $N^{th}$ portion to the host as the response to the sleep command, and then transfers the acknowledge for the entry into the sleep mode to the host and enters the sleep mode, where N is a natural number equal to or more than 2.

4. The memory system of claim 2, wherein when the result of the comparison indicates that the size of the internal data stored in the second volatile memory device exceeds the size of data which can be transferred at one time in response to the sleep command:
   the controller divides the internal data stored in the second volatile memory device into N portions of data, where N is a natural number equal to or more than 2, and
   when N exceeds a reference value, the controller programs the internal data stored in the second volatile memory device into the nonvolatile memory device, and transfers the acknowledgement for the entry into the sleep mode to the host and enters the sleep mode.

5. The memory system of claim 1, wherein the controller sends a confirmation request to the host to confirm whether a transfer of the internal data stored in the second volatile memory device to the host in response to the sleep command is allowed.

6. The memory system of claim 5, wherein when the host, in response to the confirmation request, confirms that the controller is allowed to transfer the internal data to the host, the controller outputs the internal data stored in the second volatile memory device to the host as a response to the sleep command, and then transfers an acknowledgement for an entry into the sleep mode to the host and enters the sleep mode.

7. The memory system of claim 6, wherein when the host does not indicate in response to the confirmation request that the controller is allowed to transfer the internal data to the host, the controller programs the internal data stored in the second volatile memory device to the nonvolatile memory device, and then transfers the acknowledgement for the entry into the sleep mode to the host and enters the sleep mode.

8. The memory system of claim 1, wherein when a wakeup command including the internal data is received from the host, the controller exits from the sleep mode, supplies power to the second volatile memory device, stores the internal data included in the wakeup command into the second volatile memory device, and transfers an acknowledgement for the exit from the sleep mode to the host.

9. A data processing system comprising:
   a host configured to generate a sleep command and a wakeup command and to output the generated commands; and
   a memory system comprising a nonvolatile memory device, a first volatile memory device to which power is supplied in a sleep mode, and a second volatile memory device to which power is suspended in the sleep mode, and configured to store internal data in at least any one of the first and second volatile memory devices, the internal data being generated during processing of an operation of the nonvolatile memory device, wherein when the sleep command is received from the host, the memory system outputs the internal data stored in the second volatile memory device to the host in response to the sleep command, and then transfers an acknowledgment for an entry into the sleep mode to the host and enters the sleep mode, and the host stores the internal data received from the memory system in an internal memory between a first time point at which the sleep command is outputted to the memory system and a second time point at which a wakeup command is sent to the memory system, wherein the memory system retains the internal data stored in the first volatile memory device in the sleep mode.

10. The data processing system of claim 9, wherein when the sleep command is received from the host, the memory system determines whether to divide the internal data by comparing the size of the internal data stored in the second volatile memory device with the size of data which can be transferred at one time in response to the sleep command.

11. The data processing system of claim 10, wherein when the size of the internal data stored in the second volatile memory device exceeds the size of data which can be transferred at one time in response to the sleep command, the memory system divides the internal data stored in the second volatile memory device into N portions of data, sequentially outputs the divided internal data from a first portion to an $N^{th}$ portion to the host in response to the sleep command, and then transfers the acknowledgement for the entry into the sleep mode to the host and enters the sleep mode, where N is a natural number equal to or more than 2.

12. The data processing system of claim 10, wherein when the size of the internal data stored in the second volatile memory device exceeds the size of data which can be transferred at one time in response to the sleep command:

the memory system divides the internal data stored in the second volatile memory device into N portions of data, and when N exceeds a reference value, the memory system programs the internal data stored in the second volatile memory device to the nonvolatile memory device, and then transfers the acknowledgement for the entry into the sleep mode to the host and enters the sleep mode.

13. The data processing system of claim 9, wherein the memory system, in response to receiving the sleep command, sends a confirmation request to the host to confirm whether a transfer of the internal data stored in the second volatile memory device to the host is allowed, and wherein when the confirmation request is received by the host from the memory system between the first time point and reception of the acknowledgement for the entry into the sleep mode, the host:

checks the state of the internal memory, determines, according to the check result, whether the memory system is allowed to transfer the internal data to the host, and transfers to the memory system an acknowledgement indicating whether the memory system is allowed to transfer the internal data to the host.

14. The data processing system of claim 13, wherein the memory system, in response to the acknowledgment indicating that the memory system is allowed to transfer the internal data to the host, outputs the internal data stored in the second volatile memory device to the host as a response to the sleep command, and then transfers the acknowledgment for the entry into the sleep mode to the host and enters the sleep mode.

15. The data processing system of claim 14, wherein the memory system, in response to the acknowledgment indicating that the memory system is not allowed to transfer the internal data to the host, programs the internal data stored in the second volatile memory device to the nonvolatile memory device, and then transfers the acknowledgement for the entry into the sleep mode to the host and enters the sleep mode.

16. The data processing system of claim 15, wherein the host includes second data stored in the internal memory in the wakeup command and outputs the wakeup command with the second data to the memory system, wherein when the wakeup command is received by the memory system from the host, the memory system exits from the sleep mode, supplies power to the second volatile memory device, stores the second data included in the wakeup command into the second volatile memory device, and transfers an acknowledgment for an exit from the sleep mode to the host.

17. An operating method of a memory system, the operating method comprising:

receiving a sleep command from a host external to the memory system, the memory system including a nonvolatile memory device, a first volatile memory device to which power is supplied in a sleep mode, and a second volatile memory device to which power is suspended in the sleep mode;

outputting internal data stored in the second volatile memory device to the host in response to the sleep command after the receiving of the sleep command;

transferring an acknowledgment for an entry into the sleep mode to the host;

entering the sleep mode after the outputting of the internal data; and retaining the internal data stored in the first volatile memory device in the sleep mode, wherein the memory system is configured to store the internal data in at least any one of the first and second volatile memory devices, the internal data being generated during processing of an operation of the nonvolatile memory device.

18. The operating method of claim 17, wherein the outputting of the internal data comprises:

determining whether to divide the internal data by comparing the size of the internal data stored in the second volatile memory device with the size of data which can be transferred at one time in response to the sleep command;

in response to determining to divide the internal data:

dividing the internal data stored in the second volatile memory device into N portions of data;

outputting the divided internal data from a first portion to an $N^{th}$ portion to the host as a response to the sleep command when N is less than a reference value; and programming the internal data stored in the second volatile memory device to the nonvolatile memory device when N exceeds the reference value.

19. The operating method of claim 17, further comprising:

in response to the receiving of the sleep command, confirming whether a transfer of the internal data stored in the second volatile memory device to the host is allowed;

performing the outputting of the internal data in response to the host indicating that the memory system is allowed to transfer the internal data to the host; and programming the internal data to the nonvolatile memory device, when the host indicates that the memory system is not allowed to transfer the internal data to the host.

20. The operating method of claim 17, further comprising:

in response to receiving a wakeup command from the host:
- exiting from the sleep mode,
- supplying power to the second volatile memory device,
- storing the internal data included in the wakeup command into the second volatile memory device, and
- transferring an acknowledgement for an exit from the sleep mode to the host.

* * * * *